United States Patent

Bride et al.

[11] Patent Number: 5,373,042
[45] Date of Patent: Dec. 13, 1994

[54] MOLDING AND SEALING COMPOUND

[75] Inventors: Gabriele Bride, Nussloch; Gisbert Kern, Mannheim; Wolfgang Lepka, Heidelberg; Michael Schätzle, Walldorf, all of Germany

[73] Assignee: Teroson GmbH, Heidelberg, Germany

[21] Appl. No.: 91,531

[22] Filed: Jul. 14, 1993

Related U.S. Application Data

[63] Continuation of Ser. No. 713,196, Jun. 10, 1991, abandoned.

[30] Foreign Application Priority Data

Jun. 15, 1990 [DE] Germany ............................ 4019074

[51] Int. Cl.$^5$ .............................................. C08K 5/20
[52] U.S. Cl. .................................... 524/230; 524/588; 524/783; 524/788; 524/849; 524/850; 524/853; 524/859; 524/860; 524/869; 525/104
[58] Field of Search ................ 524/588, 230, 783, 788, 524/849, 850, 853, 859, 860, 869; 525/104

[56] References Cited

U.S. PATENT DOCUMENTS

| 3,407,166 | 10/1968 | Kuceski et al. | 524/230 |
| 3,971,751 | 7/1976 | Isayama et al. | 524/853 |
| 4,323,488 | 4/1982 | Takago et al. | 528/32 |
| 4,368,284 | 1/1983 | Tawada et al. | 524/230 |
| 4,753,760 | 6/1988 | Kawaguchi et al. | 524/230 |

FOREIGN PATENT DOCUMENTS 0264072 4/1988 European Pat. Off. .

OTHER PUBLICATIONS

JP-A-63 015 876 (Mitsui Toatsu Chemicals) 22, Jan. 1988 Abstract.

*Primary Examiner*—John C. Bleutge
*Assistant Examiner*—Karen A. Dean
*Attorney, Agent, or Firm*—Ernest G. Szoke; Wayne C. Jaeschke; Real J. Grandmaison

[57] ABSTRACT

A one-component moulding and sealing compound based on prepolymers with terminal silyl groups with at least one hydrolyzable substituent on the Si atom, organo-metallic tin compounds as the catalyst and also inorganic fillers containing a polyvinyl chloride and fatty acid amide having thixotropic effect to reduce surface tackiness.

16 Claims, No Drawings

MOLDING AND SEALING COMPOUND

This application is a continuation of application Ser. No. 07/713,196 filed on Jun. 10, 1991, now abandoned.

The invention relates to a one-component moulding and sealing compound based on SMP polymers which can be stored under the exclusion of water, but which on the access of water can be cross-linked into elastomers and displays improved surface tackiness properties.

Moisture-hardening one-component moulding and sealing compounds are already known per se. A known group of such compounds contains as prepolymers so-called SMP polymers which can be cross-linked by atmospheric moisture and which are compounds with terminal silyl groups with at least one hydrolyzable substituent on the Si atom. Such prepolymers, and also moulding and sealing compounds produced therefrom, are described in detail in DE-PS 38 16 808 with reference to other publications. Reference is hereby made to the full scope of the disclosure of DE-PS 38 16 808.

Moulding and sealing compounds based on SMP polymers react to form elastomers on the access of moisture such that the surface exhibits considerable tackiness and thus they cannot be used in any situation where there is contamination, or any risk of contamination, by dust or like substances. The basic aim of the invention was accordingly to reduce this surface tackiness so that there is no possibility of any contamination of a lasting nature on contact with dusts of different types, (it must be possible to remove the contamination easily with a brush, cloth or by means of water).

To achieve this aim a one-component moulding and sealing compound is proposed which is based on prepolymers which contain terminal silyl groups with at least one hydrolyzable substituent on the Si atom, organo-metallic tin compounds as the catalyst and inorganic fillers, which is characterized in that it contains polyvinyl chloride (PVC) and fatty acid amide having thixotropic effect (for the sake of brevity named "thixotropic fatty amide" throughout the specification).

It was surprisingly found that PVC already greatly reduces the surface tackiness of moulding and sealing compounds based on SMP polymers. Thixotropic fatty acid amide (wax) also has a slight effect. It was therefore completely surprising that the combination of PVC/thixotropic fatty acid amide (wax) brings about an optimal reduction of the surface tackiness, i.e. PVC and thixotropic fatty acid amide (wax) produce a synergistic effect.

As usual, the term polyvinyl chloride (PVC) includes vinylchloride homopolymers and those vinyl chloride copolymers in which the vinyl chloride is the predominant part and constitutes more than 50% by weight. According to the invention so-called emulsion types are preferred, i.e. polyvinyl chlorides produced by emulsion polymerization. The polymerization takes place in this case in an aqueous medium with peroxides used as catalysts. The polyvinyl chlorides obtained after filtration contain fluctuating quantities of emulsifiers. The K-value (DIN 53726) of these emulsion types is, for example, in the range of 59 to 79. As a rule the preferred PVC-emulsion types are those which are also suitable for the production of PVC pastes (PVC/plasticizer mixtures).

The thixotropic fatty acid amides to be used according to the invention are commercially available products which are supplied as thixotropic agents. These are generally mixtures of fatty acid amides. For example, a fatty acid amide thixotropic agent has proven particularly suitable which has a soluble proportion of fatty acid amides with relatively low molecular weight and an insoluble proportion of fatty acid amides with high molecular weight.

The proportion of PVC in the moulding and sealing compound according to the invention is limited substantially by the fact that the viscosity increases to such a great extent that the limit for workability from cartridges is reached. As a rule this is the case at approx. 10% by weight PVC. Usually the proportion of PVC in the moulding and sealing compound according to the invention is therefore, depending on the application, between 1 and 10% by weight and particularly 5 to 10% by weight.

The effectiveness of the addition of thixotropic fatty acid amide (wax) was tested up to a concentration of 3% by weight. The synergistic effect found with PVC was observed over the whole concentration range. However, thixotropic fatty acid amide (wax) is very expensive and thus the use of higher concentrations appears uneconomical. Concentrations of thixotropic fatty acid amide (wax) preferred for practical use should therefore not exceed 3.0% by weight and should preferably lie in the range of 0.1 to 0.5% by weight and particularly 0.2 to 0.3% by weight.

As a result of the addition of the combination of PVC/thixotropic fatty acid amide (wax), the 100% modulus increases. If this should be undesirable or of disadvantage for the intended use of the moulding and sealing compound according to the invention, it is possible to balance out this rise in the 100% modulus to a very large extent by means of a further additive. A fatty acid amide (wax) has proven to be a suitable additive for this purpose which is a reaction product of ethylene diamine and stearic and/or palmitic acid. This additive is used in quantities of 0.05 to 1% by weight and preferably 0.1 to 0.3% by weight, depending on the increase in the 100% modulus.

The silyl-modified prepolymers (SMP polymers) are polyethers, polyesters, ether-ester block copolymers, vinyl polymers, phthalic acid diallyl esters and their prepolymers and also phthalic acid diallyl ester copolymers, which in each case contain at least one silyl group of the following formula I in the molecule

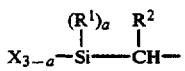

which $R^1$ and $R^2$, independently of each other, represent hydrogen atoms or alkyl, aryl or aralkyl radicals with up to 10 carbon atoms, X represents a hydrolyzable group and a can be 0, 1 or 2. X can be a halogen atom or an alkoxy, aminoxy, phenoxy, thioalkoxy, acyloxy, acid amide, mercapto or ketoximato group. It is preferably an alkoxy group with 1 to 5 carbon atoms in the alkyl radical. A particularly preferred silyl terminal group is the dimethoxymethylsilyl group.

The molecular weight of the prepolymers can be between 500 and 20,000, preferably between 500 and 15,000. It is most particularly preferred for the molecular weight to be 3,000 to 12,000. Particularly preferred prepolymers are silyl-modified polyethers, which can be obtained by the hydrosilylation of polyethers with olefinically unsaturated terminal groups, cf. U.S. Pat.

No. 3,971,751. Suitable silyl-modified polyethers correspond, for example, to formula II:

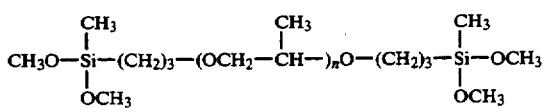

For the production of moisture-hardening moulding and sealing compounds, organo-metallic tin compounds, e.g., tin(II) octoate or dibutyl tin laurate and dibutyl tin maleate (U.S. Pat. No. 3,971,751) are added as catalyst to the known silyl-modified polymers. The application properties of the compounds according to the invention are, however, also influenced by the selection of the organo-metallic tin compound. The reaction product, obtained at about 150° C., of dibutyl tin oxide with dioctyl phthalate and dibutyl tin acetate have proved to be particularly suitable as catalysts. Surprisingly, dibutyl tin dialkylates of $C_3$- to $C_6$-alcohols, particularly dibutyl tin dibutylate, are also particularly suitable.

Inorganic fillers, such as carbon black, calcium carbonate, titanium oxide and the like, and also plasticizers, in particular phthalic acid esters, such as dioctyl phthalate, butylbenzyl phthalate, or phosphoric acid esters, such as tricresyl phosphate are also added.

As inorganic fillers, highly dispersed silicas are preferably used according to the invention, particularly pyrogenic silicas or precipitated silicas, which have a thixotropic effect, and whose thixotropic properties are retained in the compounds according to the invention even after prolonged storage. Finally, the compounds can contain known UV-stabilizers and anti-ageing agents. Aminosilanes, such as, for example, gamma-glycidyl-oxypropyl- or gamma-aminopropyl-trimethoxysilane, are used primarily to improve the adhesion to glass, metals etc. At the same time they trap any moisture in the fillers, and thus ensure a good storage-stability and act to a certain extent as co-catalyst.

In addition, the stabilizers known from DE-PS 38 16 808 (isocyanate and/or carboxylic acid chloride) can be used in the moulding and sealing compound according to the invention. In this case, it has proved particularly favourable in the production of the compound according to the invention if the organo-metallic tin compounds are added at the same time as the stabilizer after the mixing of the other components of the compound.

All the aforementioned components of the compound according to the invention are commercially available, and therefore a more detailed description is not necessary.

Owing to the achievement according to the invention of a tack-free surface of vulcanized moulding and sealing compounds based on SMP polymers, the use of such products for all technical areas has become possible.

The following example is intended to explain the invention in more detail, but the invention is not limited thereto.

EXAMPLE

The following sealants A to E were produced by mixing the components named below under a vacuum (moisture excluded), in the order indicated, in a stirred tank by means of a planetary dissolver:

|  | A | B | C | D | E |
|---|---|---|---|---|---|
| MS polymer 20 A* | 15.00 | 15.00 | 15.00 | 15.00 | 15.00 |
| MS polymer 300* | 15.00 | 15.00 | 15.00 | 15.00 | 15.00 |
| Dioctyl phthalate | 8.40 | 8.40 | 8.40 | 8.40 | 8.40 |
| gamma-aminopropyl-trimethoxisilane | 0.25 | 0.25 | 0.25 | 0.25 | 0.25 |
| gamma-glycidyloxi-propyltrimethoxisilane | 0.25 | 0.25 | 0.25 | 0.25 | 0.25 |
| inyltrimethoxisilane | 0.60 | 0.60 | 0.60 | 0.60 | 0.60 |
| Anti-ageing agent | 0.30 | 0.30 | 0.30 | 0.30 | 0.30 |
| UV-protecting agent | 0.30 | 0.30 | 0.30 | 0.30 | 0.30 |
| Hydrogenated castor oil | 4.30 | 4.30 | 4.30 | 4.30 | 4.30 |
| Chalk | 48.50 | 38.50 | 40.50 | 43.25 | 43.00 |
| Polyvinyl chloride (emulsion type) |  | 10.00 | 5.00 | 5.00 | 5.00 |
| Fatty acid amide (wax)** |  |  |  |  | 0.25 |
| Fatty acid amide (wax) (thixotropic) |  |  | 3.00 | 0.25 | 0.25 |
| Intermediate product I (colour paste) | 6.70 | 6.70 | 6.70 | 6.70 | 6.70 |
| Dibutyl tin dibutylate | 0.40 | 0.40 | 0.40 | 0.40 | 0.40 |
|  | 100.00 | 100.00 | 100.00 | 100.00 | 100.00 |
| Intermediate product 1 |  |  |  |  |  |
| Dioctyl phthalate | 43.530 |  |  |  |  |
| Iron oxide | 56.470 |  |  |  |  |
|  | 100.00 |  |  |  |  |

*bis [3-(methyldimethoxysilyl)propyl]polyoxypropylene
**reaction product of ethylene diamine and stearic or palmitic acid These sealants were then applied to glass and polyethylene sheets and painted woods to test adhesion, Shore A hardness, depth-hardening rate and surface-tackiness. The results are summarized in the following table:

| Test | A | B | C | D | E |
|---|---|---|---|---|---|
| Glass adhesion | + | + | + | + | + |
| Stability | + | + | + | + | + |
| Shore A hardness (after 7 days standard climate*) | approx. 20 | approx. 26 | approx. 26 | approx. 25 | approx. 25 |
| Depth hardening in mm (after 24 h standard climate*) | approx. 3 | approx. 3 | approx. 3 | approx. 3 | approx. 3 |
| Paint adhesion | + | + | + | + | + |
| 100% modulus (DIN 18545 E) (N/mm²) | 0.44 | 0.49 | 0.38 | 0.37 | 0.34 |
| Surface tackiness** (after 24 h standard climate) Barr test in H-cm | 40 | 15 | 7 | 7 | 7 |

*Standard climate: 23° C., 50% rel. atmospheric humidity (DIN 50014)

The results obtained show that the combination of PVC/fatty acid amides (wax, thixotropic type) produces the greatest effect as regards the reduction of the surface-tackiness. For reasons of economy the proportion of thixotropic fatty acid amide is to be kept as low as possible. The tests also show that the increase in the tensile tearing strength due to the addition of PVC can be balanced out by another fatty acid amide (wax) type (based on the reaction product of ethylene diamine with stearic and/or palmitic acid).

We claim:

1. A moisture-hardening one-component molding and sealing compound consisting essentially
   (a) a prepolymer containing silyl terminal groups of the following Formula I in the molecule:

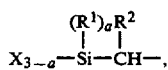

(I)

in which $R^1$ and $R^2$, independently of each other, represent hydrogen atoms or alkyl, aryl or aralkyl radicals with up to 10 carbon atoms, X represents a hydrolyzable group and a can be 0, 1 or 2, (b) a catalyst consisting of an organo-metallic tin compound, (c) an inorganic filler, (d) from about 1 to about 10% by weight of polyvinyl chloride, and (e) from about 0.1 to about 0.5% by weight of a fatty acid amide having thixotropic properties, all weights of (a)–(e) being based on the weight of said compound.

2. A compound as in claim 1 wherein said polyvinyl chloride is present in an amount of from about 5 to about 10% by weight, based on the weight of said compound.

3. A compound as in claim 1 wherein said fatty acid amide is present in an amount of from about 0.2 to about 0.3% by weight, based on the weight of said compound.

4. A compound as in claim 1 further containing from about 0.05 to about 1% by weight of a 100% modulus-reducing fatty acid amide selected from the group consisting of the reaction products of ethylene diamine and stearic acid, and ethylene diamine and palmitic acid, based on the weight of said compound.

5. A compound as in claim 4 wherein said fatty acid amide is present in an amount of from about 0.1 to about 0.3% by weight, based on the weight of said compound.

6. A compound as in claim 1 wherein said prepolymer comprises a silyl-modified polyether prepolymer.

7. A compound as in claim 1 wherein said polyvinyl chloride was produced by emulsion polymerization.

8. The process of reducing the surface-adhesiveness of a moisture-hardening molding and sealing compound consisting essentially of:

(a) a prepolymer containing silyl terminal groups of the following Formula I in the molecule:

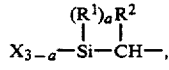

(I)

in which $R^1$ and $R^2$, independently of each other, represent hydrogen atoms or alkyl, aryl or aralkyl radicals with up to 10 carbon atoms, X represents a hydrolyzable group and a can be 0, 1 or 2, (b) a catalyst consisting of an organo-metallic tin compound, and (c) an inorganic filler, the process comprising adding to said compound (d) from about 1 to about 10% by weight of polyvinyl chloride, and (e) from about 0.1 to about 0.5% by weight of a fatty acid amide having thixotropic properties, all weights of (a)–(e) being based on the weight of said compound.

9. A process as in claim 8 wherein said polyvinyl chloride is present in an amount of from about 5 to about 10% by weight, based on the weight of said compound.

10. A process as in claim 8 including further adding to said compound from about 0.05 to about 1% by weight of a 100% modulus-reducing fatty acid amide selected from the group consisting of the reaction products of ethylene diamine and stearic acid, and ethylene diamine and palmitic acid, based on the weight of said compound.

11. A process as in claim 10 wherein said fatty acid amide is present in an amount of from about 0.1 to about 0.3% by weight, based on the weight of said compound.

12. A process as in claim 8 wherein said prepolymer comprises a silyl-modified polyether prepolymer 13. A process as in claim 8 wherein said polyvinyl chloride was produced by emulsion polymerization.

14. A process as in claim 8 wherein said prepolymer is selected from the group consisting of a polyether, polyester, ether-ester block copolymer, vinyl polymer, and phthalic acid diallyl ester, each of which contains at least one silyl group of said Formula I in the molecule.

15. A process as in claim 14 wherein X represents a halogen atom or an alkoxy, aminoxy, phenoxy, thioalkoxy, acyloxy, acid-amide, mercapto or ketoximato group.

16. A process as in claim 14 wherein X represents an alkoxy group with 1 to 5 carbon atoms in the alkyl radical.

* * * * *